May 27, 1958

R. J. BOYER ET AL 2,836,155

FLUID COOLED FURNACE

Filed Dec. 5, 1950

INVENTORS
Raymond J. Boyer
BY Charles L. Marquez, Jr.

ATTORNEY

United States Patent Office 2,836,155
Patented May 27, 1958

2,836,155

FLUID COOLED FURNACE

Raymond J. Boyer, Westfield, and Charles L. Marquez, Jr., Jersey City, N. J., assignors to The Babcock & Wilcox Company, Rockleigh, N. J., a corporation of New Jersey Application December 5, 1950, Serial No. 199,265

10 Claims. (Cl. 122—235)

The present invention relates to a fluid cooled furnace and more particularly to the construction and operation of a furnace arranged in combination with a subjacent ash collector or ash collecting receptacle having fluid cooled walls integral with fluid cooled walls of the furnace.

As disclosed herein, the invention is embodied in a vapor generator having upright fluid cooled walls which form lateral boundaries of the furnace combustion chamber and which are extended to form corresponding boundaries of the ash collecting receptacle which is arranged subjacent thereto, such walls including wall cooling tubes which are continuous throughout the combined height of the furnace and receptacle and which furthermore are arranged so as to serve as vapor generating elements.

The furnace is especially arranged for the combustion therein of ash-bearing fuel in suspension and for the continuous discharge of residual non-combustible ash particles into the receptacle. The total area of communication between the furnace and receptacle for the discharge of such ash is provided by an unobstructed passage of considerably smaller horizontal cross section than the horizontal cross section of either the furnace or the receptacle, whereby ash collected in the receptacle is largely shielded from radiant heat of the furnace by intervening fluid cooled wall portions which separate the receptacle from the furnace. Due to the combined cooling and shielding effect of walls associated with the receptacle, the ash particles are collected and maintained in solid form within the receptacle and thus are in suitable condition for convenient discharge to an ash conveying system for ultimate disposal thereof.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of our invention.

Figure 1:
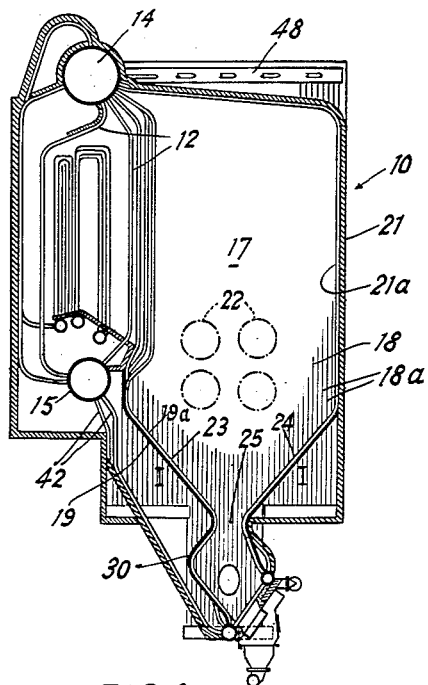
Fig. 1 is a front sectional view of a vapor generator comprising a furnace and an ash collector constructed and arranged in accordance with our invention.

Fig. 1 illustrates the invention as embodied, for example, in a known form of vapor generator having a furnace 10 arranged laterally of a natural circulation boiler section which comprises upright tubes 12 extending between and connected to upper and lower drums 14 and 15 respectively. The furnace combustion chamber 17 is defined by upright fluid cooled furnace walls which include a rear wall 18, an opposing front wall, not shown, and opposing side walls 19 and 21 arranged parallel to drums 14 and 15. Fuel such as pulverized coal, for example, is introduced into chamber 17 by suitable burner means 22, herein indicated as being positioned in the front wall of the furnace.

The furnace side walls 19 and 21 are formed with inclined lower side wall portions 23 and 24 which converge downwardly in symmetrical relationship toward a relatively narrow ash discharge passage or throat 25 and thus provide a hopper bottom or floor for combustion chamber 17. At the throat, the side walls 19 and 21 are formed so as to present opposing convex surfaces as indicated.

At elevations below throat 25, the side walls are extended downwardly in diverging relationship as at 27 and 28 so as to define an integral ash collector, or ash collecting receptacle 30 of increased horizontal width and cross section, as compared with the horizontal width and cross section of throat 25, and thereby provide adequate volume for the accumulation of ash over relatively long operating periods. One of the ash collector side walls, such as wall 28, terminates at an elevation intermediate the height of the collector whereas, at approximately the same elevation, the opposite side wall 27 is curved inwardly as at 31 and its lower portion 32 continued downwardly to the bottom of the collector at a relatively steep inclination to the horizontal, preferably preferably at an angle greater than 45°, corresponding approximately to the inclination of wall portions 23 and 24 above the throat. Opposite ends of collector 30 are closed by lower extensions of the front and rear furnace walls. The bottom of the collector is closed by an inclined wall 34 diverging upwardly relative to the opposing wall portion 32 and having a series of horizontally spaced openings 36 therein for the discharge and removal of ash from the lowermost interior portions of the collector. A slidable door or cover 37 is provided for each ash removal opening 36, with separate door operating mechanism 38 of known form provided for each door 37 so as to permit selective operation of the respective doors. In order to uncover the openings, doors 37 are moved upwardly along the inclined outer face of wall 34. Openings 36 communicate with a suitable ash disposal system, of a known type, either pneumatic, or hydraulic type, as generally indicated by numeral 39.

In the embodiment herein disclosed, all walls of the combustion chamber 17, and of the integral ash collector 30, are cooled by means of wall tubes which are supplied with water from the boiler section comprising drums 14 and 15. In the respective walls, the wall tubes are arranged upright and conform to the configuration of the associated wall portions, whether planar or curved. In side wall 19, the corresponding wall tubes 19a are connected at their lower ends to a bottom header 41 to which water is supplied from the lower drum 15 through suitable downcomer means such as tubes 42. In the outer side wall 21, the wall tubes 21a are connected at their lower ends to a header 43, intermediate the height of ash collector 30, and water is supplied to header 43 through tubes 45 which are connected at their upper ends to header 43 and at their lower ends to header 41, the water supply tubes 45 being distributed along the bottom collector wall 34 between ash removal openings 36. The rear furnace wall tubes 18a, in two outer panels, are connected at their lower ends to headers 46 at an elevation adjacent the throat 25, and in an intermediate panel, are connected at their lower ends to a header 47 at approximately the elevation of the bottom collector header 41. Tubes 18a, in all panels, are connected at their upper ends to a header 48 from which riser connections are made to drum 14, in suitable known manner. The wall cooling tubes in the front furnace wall, not shown, may be arranged and connected substantially as described for rear wall cooling tubes 18a. Suitable downcomer connections, not shown, may be made from the lower drum 15 to the lower wall headers 46 and 47 in rear wall 18, and to corresponding header means, not shown in the opposite front wall.

For the purpose of this application, it is assumed that the weight of the entire vapor generating unit is supported at an elevation above the inclined lower side wall portions 23 and 24 of the combustion chamber, whereby the expansion of all upright furnace wall portions, and of all wall cooling tubes associated therewith, takes place in a downward direction from a common elevation of support. The actual means of support, not shown, may therefore consist of an overhead structure from which the entire unit is suspended at an elevation above the upper drum 14, or may consist of the structure disclosed in U. S. Patent 2,583,599, of January 29, 1952, as issued in the copending application of Glen J. Schoessow, Serial No. 654,239, filed March 14, 1946, whereby the unit is vertically supported at approximately the elevation of the lower drum 15. In either case, all upright furnace walls, including the front, rear and side walls, and wall cooling tubes associated therewith, are free to expand downwardly from an elevation of support at least as high as the elevation at which the lower boiler drum 15 is disposed. The ash collecting receptacle 30 is formed by integral extensions of furnace walls which are top-supported at a common elevation above the throat 25 and accordingly is free to move vertically in unison with the movement of such suspended wall portions.

Figures 2, 3:
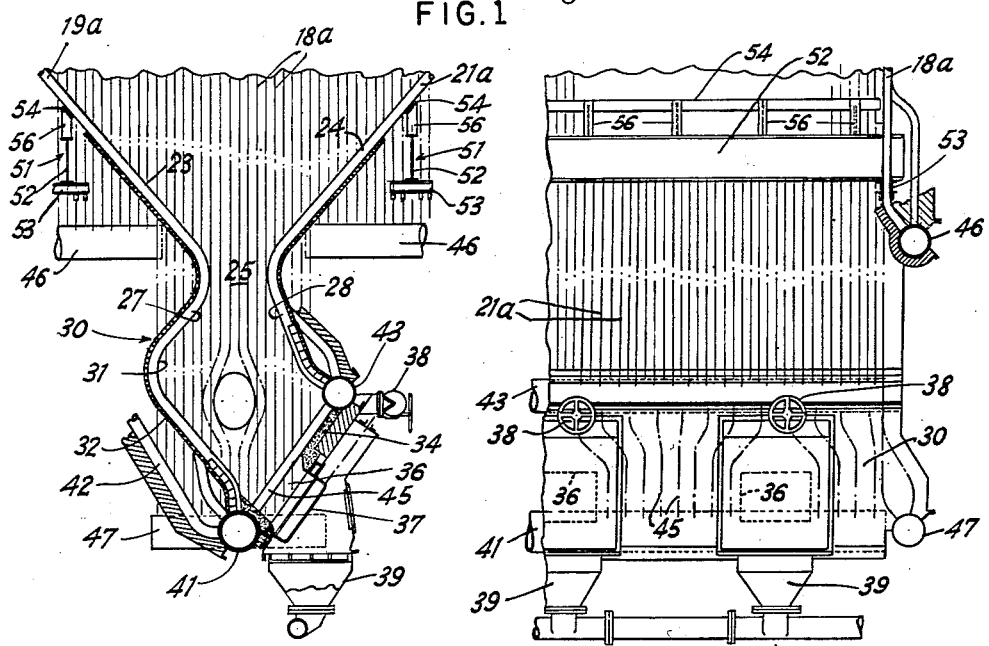
Fig. 2 is a fragmentary enlargement of Fig. 1 showing details of the ash collector structure.
Fig. 3 is a side view of the structure shown in Fig. 2.

In order to provide adequate support for collector 30, without restraining vertical movement thereof, the inclined furnace wall portions 23 and 24, above throat 25, are tied-in to the front and rear furnace walls by means of structural supports generally indicated at 51. Each collector support 51 includes a beam 52 which extends horizontally between lower extended portions of the front and rear furnace walls and is supported at opposite ends on wall cooling tubes of the respective walls. As indicated in Fig. 3, at rear wall 18, the corresponding end of beam 52 extends between wall tubes 18a to a point exteriorly of the combustion chamber 17 where the beam is supported on channel members 53 which are secured to selected tubes 18a at opposite sides of the beam. Similar supports for beam 52 may be provided at the front wall, not shown. Above each beam 52, a tie bar 54 is secured by welding, for example, to each wall tube 19a, or 21a and, for each side wall, a series of spaced supports 56 are interposed between a tie bar 54 and a beam 52, each spacer support 56 having its upper end portion welded to a tie bar 54, and having its lower end portion resting on beam 52 without attachment thereto, thereby allowing for differential longitudinal movement of each tie bar 54 relative to the corresponding beam 52 as the result of expansion and contraction of the wall and bar during operation of the furnace.

In accordance with the foregoing disclosure, the ash collecting receptacle 30 is combined with the furnace 10 in such manner as to form an integral gas tight construction therewith. Heretofore, with a furnace chamber terminating in a lower throat area, such as is provided by throat 25, it has been customary to construct a separate ash pit in a position beneath the throat so as to provide a chamber within which ash discharged from the furnace could be allowed to accumulate until such time that disposal of the collected ash became necessary or desirable. Such an ash pit, due to its construction as a separate unit, has required separate support and furthermore has entailed the provision of a suitable expansion joint and gas seal between the furnace and the ash pit, thereby increasing the total height required for the furnace and ash pit combined and resulting in increased cost of the complete installation. Furthermore, a combination expansion joint and gas seal structure in such a location requires regular attention and unless maintained so as to function properly, a considerable loss in furnace efficiency may result due to air leakage into the furnace combustion chamber.

Moreover, the separate ash pit is generally an uncooled refractory lined structure and thus requires considerable maintenance which is often the direct cause of boiler outage until repairs can be completed.

In contrast, applicants provide a unitary fluid cooled structure which combines both the furnace and the ash collecting receptacle, thereby effecting a reduction in the total overall height and cost of the installation, and furthermore providing a structure which is gas tight throughout, and thus particularly adapted for use in installations wherein the furnaces are desirably operated under superatmospheric pressure conditions. In addition, with the walls of the ash collector being formed integral with walls of the furnace, the wall cooling tubes for the respective walls may be installed in continuous lengths and conveniently connected into the circulatory system of the vapor generator.

While, in accordance with the provision of the statutes we have illustrated and described herein the best form of our invention now known to us, those skilled in the art will understand that changes may be made in the form of the apparatus disclosed without departing from the spirit of the invention covered by our claims, and that certain features of our invention may sometimes be used to advantage without a corresponding use of other features.

We claim:

1. In combination, a furnace arranged for burning ash-bearing fuel in suspension and having upright fluid cooled walls forming lateral boundaries thereof, said walls including a pair of opposing fluid cooled walls having downwardly converging portions forming the floor of said furnace and defining an unobstructed throat through which ash is discharged from said furnace, an ash collecting receptacle arranged subjacent said furnace and suspended therefrom in a position to receive ash discharged through said throat, said receptacle having walls defining an ash collecting space of greater horizontal cross section than said throat and having an ash removal opening formed in one of said walls through which ash is discharged from the lowermost portion of said space, said receptacle walls comprising a pair of opposing fluid cooled walls formed as integral extensions of said opposing fluid cooled walls of said furnace and continuing throughout the height of said receptacle, said opposing receptacle walls having lower portions diverging upwardly toward said throat, and reciprocable closure means for said ash removal opening.

2. The combination as claimed in claim 1 wherein said opposing walls common to said furnace and said receptacle are formed with wall cooling tubes arranged in continuous lengths substantially throughout the vertical extent of said furnace and receptacle, and further comprising a header adjacent the bottom of said receptacle, and means including said header for supplying cooling liquid to the lowermost ends of said wall cooling tubes.

3. In a vapor generator, a furnace arranged for burning ash-bearing fuel in suspension and comprising fluid cooled walls forming outer boundaries of said furnace, said furnace walls including a pair of opposing fluid cooled walls having downwardly converging portions forming the floor of said furnace and defining an unobstructed throat between said portions through which ash is discharged from said furnace, an ash collecting receptacle arranged subjacent said furnace and suspended therefrom in a position to receive ash discharged through said throat, said receptacle having walls defining an ash collecting space of greater horizontal cross section than said throat and having an ash removal opening formed in one of said walls through which ash is discharged from the lowermost portion of said space, said receptacle walls including a pair of opposing fluid cooled walls formed as integral extensions of said opposing walls of said furnace and having upper portions diverging downwardly from said throat and lower portions diverging upwardly toward said throat, said opposing fluid cooled walls of said receptacle and said furnace being formed with wall cooling tubes arranged upright in continuous lengths substantially throughout the vertical extent of said receptacle and furnace, a header adjacent the bottom of said receptacle to which the lowermost ends of wall cooling tubes in one of said receptacle walls are directly connected, means including said header for supplying liquid to wall cooling tubes of said opposing walls of said receptacle and furnace, and closure means for said ash removal opening.

4. In a vapor generator, a furnace arranged for burning ash-bearing fuel in suspension and comprising fluid cooled walls forming outer boundaries of said furnace, said furnace walls including a pair of opposing fluid cooled walls having downwardly converging portions forming the floor of said furnace and defining an unobstructed throat between said portions through which ash is discharged from said furnace, an ash collecting receptacle arranged subjacent said furnace and suspended therefrom in a position to receive ash discharged through said throat, said receptacle having walls defining an ash collecting space of greater horizontal cross section than said throat and having an ash removal opening formed in one of said walls through which ash is discharged from the lowermost portion of said space, said receptacle walls including a pair of opposing fluid cooled walls formed as integral extensions of said opposing walls of said furnace and having upper portions diverging downwardly from said throat and lower portions diverging upwardly toward said throat, said opposing fluid cooled walls of said receptacle and said furnace being formed with wall cooling tubes arranged upright in continuous lengths substantially throughout the vertical extent of said receptacle and furnace, one of said opposing receptacle walls being solid throughout and extending to the bottom of said receptacle and the other of said walls having a solid upper portion terminating at an elevation intermediate the height of said receptacle, a header adjacent the bottom of said receptacle to which wall cooling tubes of said one wall are connected and a header intermediate the height of said receptacle to which wall cooling tubes of said other wall are connected, said headers being disposed respectively above and below said ash removal opening, said other receptacle wall having fluid cooled portions disposed between said headers at opposite sides of said ash removal opening.

5. In a vapor generator having a natural circulation boiler section comprising an upper and a lower drum, a furnace arranged laterally adjacent said boiler section and having means for burning ash-bearing fuel therein, said furnace having fluid cooled walls comprising opposite side walls arranged parallel to said lower drum and opposite end walls arranged transversely of said lower drum, said furnace walls being suspended from an elevation at least as high as the elevation at which said lower drum is disposed, said side walls at elevations below said lower drum having downwardly converging portions forming the floor of said furnace and defining an unobstructed throat between said portions through which ash is discharged from said furnace, an ash collecting receptacle arranged subjacent said furnace and suspended therefrom in a position to receive ash discharged through said throat, said receptacle having fluid cooled side walls and fluid cooled end walls formed as integral extensions of said side walls and end walls of said furnace and continuing throughout the height of said receptacle, and means for supporting said receptacle on said fluid cooled furnace walls comprising a support structure arranged parallel to said lower drum at an elevation below said floor and supported at opposite ends on said fluid cooled end walls of said furnace.

6. In combination, a furnace arranged for burning ash-bearing fuel and having an ash discharge opening formed in the bottom thereof, said furnace having walls converging downwardly toward said opening and defining opposite sides of said opening, an ash collecting receptacle arranged subjacent said furnace and suspended therefrom in a position to receive ash discharged through said opening, said receptacle having walls of which one wall is formed with an ash removal opening therein through which ash is discharged from the lowermost interior portion of said receptacle, said receptacle walls comprising a pair of opposing walls formed as integral continuations of said converging furnace walls and constituting walls common to said furnace and said receptacle, said opposing walls common to said furnace and said receptacle being formed with wall cooling tubes arranged in continuous lengths substantially throughout the vertical extent of said receptacle and furnace, a header at the bottom of said receptacle from which cooling liquid is supplied to said wall cooling tubes, and closure means for said ash removal opening.

7. In combination, a furnace arranged for burning ash-bearing fuel and having an ash discharge opening formed in the bottom thereof, said furnace having walls converging downwardly toward said opening and defining opposite sides of said opening, and an ash collecting receptacle arranged subjacent said furnace and suspended therefrom in a position to receive ash discharged through said opening, said receptacle having a pair of opposing walls formed as integral continuations of said converging furnace walls and defining an ash receiving space of maximum horizontal cross section at an elevation intermediate the height of the receptacle, said opposing receptacle walls having upper portions diverging downwardly from said opposite sides of said furnace opening toward said intermediate elevation, whereas lower portions of said opposing receptacle walls converge downwardly from said intermediate elevation to form a juncture of said opposing receptacle walls at the bottom of said receptacle, said opposing receptacle walls being formed with fluid conducting tubes continuing upwardly along said converging walls of said furnace, with a header adjacent said juncture of said opposing walls from which fluid is supplied to said tubes.

8. In a dry bottom furnace having furnace walls which converge beneath the furnace to form an opening through which ashes in a dry state may be discharged by gravity said furnace having water tubes extending downwardly along the inner side of said furnace walls and further extending to line the inside of said opening, an ash hopper being located beneath said opening in which said dry ashes may be allowed to accumulate without melting and fusion of the heat exposed upper layer thereof, an ash hopper roof and two oppositely disposed ash hopper walls at least one of which is inclined towards the other, the said hopper walls meeting beneath the furnace, and water tubes extending along the inner side of said roof and the inner sides of said ash hopper walls, said last-mentioned tubes being disposed to permit direct heat exchange contact with said ashes throughout the length thereof to cool said roof and said walls and thereby to extract heat from the ashes stored within said ash hopper, whereby to maintain said ashes in a dry state by preventing the melting and fusion of the upper layer of said dry ashes by the heat radiating down through said ash discharge opening.

9. In a basket type dry bottom furnace having two oppositely disposed furnace walls which converge beneath the furnace to form a slotted opening through which ashes in a dry state may be discharged by gravity said furnace having water tubes extending downwardly along the inner side of said inclined furnace walls and further extending to line the inside of said slotted opening, an ash hopper being located beneath said opening in which said dry ashes may be allowed to accumulate without melting and fusion of the heat exposed upper layer thereof, an ash hopper roof and two oppositely disposed ash hopper walls at least one of which is inclined towards the other, the said hopper walls meeting beneath the furnace to form a hopper substantially of V-shape, and water tubes extending along the inner side of said roof and the inner sides of said ash hopper walls said last mentioned tubes being disposed to permit direct heat exchange contact with said ashes throughout the length thereof to cool said roof and said walls and thereby to extract heat from the ashes stored within said ash hopper, whereby to maintain said ashes in a dry state by preventing the melting and fusion of the upper layer of said dry ashes by the heat radiating down through said ash discharge opening.

10. An ash hopper according to claim 8, having a throat extending from said opening, said throat comprising two oppositely disposed walls inclined downwardly and to one side of said opening.

References Cited in the file of this patent

UNITED STATES PATENTS

| | | |
|---|---|---|
| 2,299,559 | Rehm | Oct. 20, 1942 |
| 2,328,039 | Toomey et al. | Aug. 31, 1943 |
| 2,381,896 | Frisch | Aug. 14, 1945 |
| 2,503,148 | Balmer | Apr. 4, 1950 |
| 2,512,677 | Raynor | June 27, 1950 |
| 2,583,599 | Schoessow | Jan. 29, 1952 |